United States Patent [19]

Harvey et al.

[11] 3,849,253

[45] Nov. 19, 1974

[54] PROCESS OF IMMOBILIZING ENZYMES

[75] Inventors: Richard D. Harvey, Marion; Kurt Ladenburg, Cedar Rapids, both of Iowa

[73] Assignee: Penick & Ford, Limited, Cedar Rapids, Iowa

[22] Filed: Oct. 10, 1972

[21] Appl. No.: 296,330

[52] U.S. Cl............... 195/68, 195/63, 195/DIG. 11
[51] Int. Cl............................................. C07g 7/02
[58] Field of Search................. 195/63, 68, DIG. 11

[56] References Cited
UNITED STATES PATENTS 3,616,229   10/1971   Wildi et al. ............................ 195/63
3,730,841   5/1973    Salvatore et al. ...................... 195/63
3,746,621   7/1973    Kondo et al. .......................... 195/63
3,767,531   10/1973   Olson et al. ........................... 195/63

Primary Examiner—Lionel M. Shapiro

[57] ABSTRACT

A process of immobilizing enzymes by polymerizing to a water-insoluble state, a resinous, film-forming material capable of binding the enzyme, and carrying out the polymerization while the enzyme and the resin are in contact with the surface of a water-adsorbent, water-insoluble solid carrier material. The process is particularly applicable to the immobilization of water-soluble amylases for use in commercially converting starch and starch hydrolyzates.

9 Claims, No Drawings

PROCESS OF IMMOBILIZING ENZYMES

BACKGROUND AND PRIOR ART

Enzymes are proteinaceous substances, synthesized by plants, animals, or micoorganisms, which function as biological catalysts capable of initiating, promoting, and governing chemical reactions without being used up or becoming part of the product which is formed. They are used extensively in industry to promote certain reactions, for example, oxidation reactions, transfer reactions, and hydrolysis of carbohydrates, proteins, fats, and esters. They are normally soluble in water and are therefore suited to batch type processes wherein the enzyme is used once and discarded or inactivated after use as it would be impractical and prohibitively costly to recover and repurify it. Therefore, efforts have been made to develop enzyme systems which are in the insoluble or immobile state and which can catalyze continuous flow reactions when packed in a column or which can be easily separated from the reaction products in batch conversions and reused.

There are generally four commonly used methods of preparing water-insoluble or immobilized enzymes. These are: (1) physical or chemical adsorption on inert or ionically active carriers (Biotechnology and Bioengineering Vol. XIII, p. 309, 1971); (2) physical entrapment of the enzymes within a gel matrix, membrane, or microcapsule (Science Vol 142, page 678, 1963); (3) covalent bonding of the enzyme to an insoluble carrier (U.S. Pat. No. 3,649,457); and (4) cross-linking of the enzyme with bifunctional reagents, (U.S. Pat. No. 3,654,083).

To be suitable for industrial usage, the immobilized enzymes should be low in cost, have high stability or resistance to loss of activity on continued usage, and be readily recoverable. The adsorption process has the disadvantage that the enzyme is but loosely bound to the carrier and tends to become partially or totally resolubilized during use, especially on variation of factors such as pH, ionic strength, effects of salts, and other variations. The amount of enzyme adsorption or activity possible is limited, and it may be difficult to adsorb more than one type of enzyme at a time.

Physical entrapment of enzymes into a gel matrix with pores too small to allow escape of the enzyme protein has been used chiefly for analytical purposes. Diffusion and permeation characteristics are rate limiting, do not allow large molecular weight substrates to permeate to the enzyme, and large amounts of the enzyme tend to be inaccessible. This method of immobilization is unsuitable for amylases which act on substrates of high molecular weight that are unable to penetrate the gel matrix.

Cross-linked, immobilized enzymes although insoluble tend to be removed on continuous use from their carriers on which they are adsorbed.

Covalent coupling of enzymes to water-insoluble carriers generally requires rather costly carriers and is somewhat time-consuming and costly. These products are generally relatively expensive and the maximum enzyme loading possible on the carrier is minimal. Bonding of blends of different enzymes tends to be difficult due to different functional groups. Many carriers suitable for covalent bonding are not adaptable for column flow, for example, cellulose.

The use of immobilized enzymes in industrial processes is dependent on a relatively low cost for the support material, and on an economically practical method of carrying out the enzymatic conversions to yield a product of commercial value. Although there are numerous publications and patents on the preparation and use of immobilized enzymes, none of these are practicable, for example, to the commercial conversion of starch to glucose.

The broad object of this invention is to provide a process for preparing immobilized enzymes using low cost carriers and immobilizing agents and which are highly suitable for use in continuous flow columns or continuous stirred-tank reactors.

Other objects are to prepare immobilized enzyme systems which have relatively high activity compared to prior products, are chemically and physically stable on continued usage, and which are suitable for treatment of high molecular weight substrates.

Another object is to provide a process for preparing immobilized enzyme systems which contain more than one enzyme in easily controlled proportions.

Another object is to provide a process for modifying the physical characteristics of certain carriers to adapt them to column operation.

A further specific object is to provide a process for immobilizing starch hydrolyzing enzymes, such as the water-soluble amylases, which produces material that can be used for commercial manufacture of syrups of controlled sugar profiles, such as 92 to 98 percent glucose syrups substantially free of reversion products.

DETAILED DESCRIPTION

This invention relates to a new process of enzyme immobilization which is uniquely different from prior processes and which avoids the inherent disadvantages of prior process and which is also relatively low in cost and high in effectiveness. It has been discovered that enzymes can be permanently bonded or held on or in an inert, insoluble material by polymerizing film-forming resinous material to the insoluble state while in contact with the enzyme and the insoluble material. The surprising discovery has been made that enzymes which are thus immobilized by resin polymerization still exhibit high activity even though sufficiently insoluble to survive prolonged continuous flow of substrate through a packed column. The new process does not require a carrier having any particular chemical affinity for the enzymes. Inert, insoluble materials which are porous and capable of absorbing substantial amounts of water are especially suitable. The use of carriers having high surface area per unit volume enable the inclusion of high proportions of enzymes. The solution of enzyme may be first adsorbed on the carrier and then treated with a solution of polymerizable resinous material and polymerization of the resin accomplished under conditions which do not inactivate the enzyme. It is also feasible to mix the resin with the enzyme before absorbing on the carrier.

This new process has several distinct advantages as compared with prior processes for immobilizing enzymes. It can make use of very low cost carriers and carriers which have a very high capability for absorbing enzyme solutions. Low cost resinous materials can be used, for example, urea formaldehyde resins. This allows a very advantageous cost with respect to enzyme activity per unit weight.

Another advantage is the ease of obtaining immobilized enzymes in a physical form which resist packing or clogging in packed columns. They are, therefore, ideally suited for continuous flow column conversions. Polymerization of the resin on the carrier also imparts a degree of rigidity to the carrier which greatly improves packed column operations.

Another advantage is the relatively large proportion of enzyme which can be immobilized on a carrier as compared with processes that depend on the chemical affinity of the carrier for the enzyme. More than one enzyme can simultaneously be attached by the present process, since it does not depend on specific active attachment sites on the carrier and the enzyme. This is highly advantageous for certain enzymatic conversions which require the action of more than one enzyme, for example, the simultaneous conversion of partially hydrolyzed starch by alpha amylase and amyloglucosidase (glucoamylases).

The new process makes use of the film-forming ability of the resin polymers. Prior processes which involve inclusion of enzyme in a gel or matrix depend on permeation of the substrate, and this is not feasible for high molecular weight materials such as partially hydrolyzed starch. In the present process, the enzyme is held in place in a relatively thin film which is readily permeable, even to high molecular weight substrates. By combining such insoluble thin films containing immobilized enzymes with various inert carrier materials, a variety of physical characteristics may be attained. This is of advantage in adapting immobilized enzymes to continuous flow columns or continuous stirred tank reactors.

In practicing the process of the present invention for immobilizing a water-soluble enzyme on a carrier, a carrier material is selected which provides hydrophilic or water-wettable surfaces. Preferably, the carrier material is in sub-divided condition, such as being in the form of granules or flocs, and hydrophilic surfaces are provided on the exterior of the material. By applying an aqueous solution of the enzyme to such a sub-divided carrier material, the external hydrophilic surfaces, which have an affinity for the solution, become wetted with it. While the surfaces are wetted with the enzyme solution, the carrier material is also contacted with an aqueous solution or dispersion of a film-forming resin reagent. For the desired immobilization reaction, the resin can advantageously be in the process of polymerization to a water-insoluble state. The temperature and pH at which this polymerization occurs should be ones at which the enzyme is substantially stable, thereby avoiding loss of enzyme by inactivation during the process of the immobilization. With these conditions, there can be deposited on the hydrophilic surfaces of the carrier material a water-insoluble resin film containing the enzyme in active form. To conserve enzyme, the carrier material may first be contacted with the enzyme solution until thoroughly wetted, and thereafter excess enzyme solution can be removed by standard solids separating procedures, such as filtration, centrifugation, or decantation. Alternatively, however, the enzyme solution and the resin forming solution can be pre-mixed, and then applied to the carrier material to deposit resin film thereon containing active enzyme. After the deposition, the excess solution, which will contain both excess enzyme and excess resin forming reagent, can be separated from the carrier material by procedures such as centrifugation, filtration, or decantation. After the liquid solution has been separated as completely as possible from the coated carrier material, the material can be further processed by drying. The drying should be carried out under temperature conditions at which the enzyme is stable.

In preferred embodiments, the process of the present invention can be practiced as follows:

To a given amount of carrier, add enzyme solution. Volume and concentration can be adjusted to suit carrier and activity desired in the final product. Add resin; ph adjusted for proper curing. Resin may be added in a range from 10 to 200 percent on the dry solids weight of carrier. This will vary with type of resin, the carrier used, type and amount of enzyme used. However, the preferred range will normally be 30–100 percent on D.S. (dry solids) carrier weight.

The carrier-enzyme-resin mixture is then dried and allowed to cure (polymerize). Drying may take place as in forced air oven or vacuum oven with the temperature used being dependent upon the stability of the enzyme at the pH being used. The rate and degree of curing will vary as the drying conditions are varied and also vary considerably with the type and D.P. Of the resin used. Curing for some resin is essentially complete on drying, while others may require up to 30 days' aging to effect an adequate cure.

Many modifications of this basic procedure may be used:

1. It may be desirable with some carriers to suspend or disperse the carrier in excess enzyme solution to assure complete wetting of the carrier. The excess enzyme solution can be removed by draining, centrifuging, or filtration prior to resin addition.
2. Enzyme solution and resin solution may be mixed before addition to the carrier. The total volume of the solution should not exceed the moisture holding capacity of the carrier for an efficient process.
3. The carrier-enzyme-resin mixture may be allowed to polymerize without drying; however, drying normally greatly accelerates curing.

The carrier should be an insoluble material which retains moisture when dispersed in water and drained. The carrier may advantageously be in the physical form of water-absorbing granules or flocs. It is desirable that the carrier wet readily with water and retain relatively high moisture content, but it need not be porous. Such hydrophilic carriers include, but are not limited to nylon, carbon, cellulose, granular absorbent resin, cellulose acetate, ion exchange resin, polyvinylpyrrolidone, and perlite filter aid.

Suitable water soluble amylases include glucoamylase, beta amylase, and alpha amylase. It is desirable that some enzymes be purified by alcohol precipitation or other suitable means to remove salts which may interfere with or inhibit resin polymerization. The process can also be used with other enzymes obtained from vegetable, animal, or microbial sources. Typical of these are ribonuclease, trypsin, ficin, subtilisin, catalase, pepsin, papain, carboxypetidase, rennin, chymotrypsin, and the like. Enzyme mixtures can also be employed.

The suitable resins can be classified as those which are soluble in water or a water-miscible solvent which will polymerize to form a water-insoluble film.

Such resins include but are not limited to melamine-formaldehyde resins, methylated melamineformaldehyde resins, urea-formaldehyde resins, cationic urea-formaldehyde resins, dimethylol urea resins, cationic polyacrylamide resins, alkyd resins, polyamideamineepichlorhydrin resins, and phenolic resins. A preferred subclass for immobilizing soluble amylases is the formaldehyde-type resins of those listed, particularly the melamine and urea formaldehyde resins. Mixtures of such resins can also be used where the blends are capable of polymerizing.

For purposes of analytical examination, the immobilized amylase enzyme products can be dispersed in water and thoroughly washed. A sample is then transferred quantitatively to a solution of 30 percent D.S. (dry solids) acid-thinned starch having a 10–14 percent D.E. (Dextrose Equivalent) and incubated for 1 hour at 140° F. with constant agitation. At the end of 1 hour, the reaction is stopped and product assayed for dextrose content or total reducing value. Activity is expressed as I.G.U. units per gram dry weight. One I.G.U. unit (immobilized glucoamylase unit) is described as the amount of enzyme that will catalyze, under assay conditions, the production of 1 gram of dextrose in 1 hour.

This assay, when based on total reducing value, is suitable for expressing a relative activity of beta amylase and alpha amylase, as well as glucoamylase.

The enzymatic activity of the final product may vary depending on the tendency of the carrier to absorb the enzyme and resin solutions (which is a function of its particle size, shape, porosity, and density) and the concentrations of the enzyme and resin solutions. Variations in the carrier characteristics can be compensated for by adjusting the concentrations of the enzyme and resin solution(s) used. The enzyme activity desired will depend on the nature of the substrate used and of the product desired as well as on the equipment size, design, flow rate, etcetera. The enzyme loading or activity of the immobilized enzyme product can therefore be varied over wide limits.

The amount of resin used per unit of carrier will depend on the nature of the carrier and properties of the resin and amount of enzyme used. Too little resin yields a product which is not stable and from which the enzyme may be washed or leached. Too much resin produces a deeply entrapped enzyme with consequent apparent reduced activity. Resin has been added in a range from 5 to 200 percent (dry solids resin on dry solid weight of carrier). The preferred range is normally 30–100 percent on this basis.

Suitable reaction conditions include the following procedures: Mixture of enzyme, carrier, and resin can be carried out at room temperature. Unless the carrier is difficult to wet, the only time required is for thorough mixing. Some carriers may be more difficult to wet completely, and in the case of some porous carriers this may be overcome in part by applying a vacuum to the mixture of carrier and enzyme solution.

Commercial resin is usually received in a state suitable for storage such as a dry powder or a viscous solution. It is usually advantageous to adjust the solids to assure proper application to the carrier. The diluent used will depend on the nature of resin and on whether it is solvent or water soluble.

The resin monomer or soluble low polymer may require pH adjustment to catalyze the polymerization reaction. The PH of the solution used depends on the stability of the enzyme and on conditions required for proper curing of the resin. In general, known polymerizing pH's are suitable, providing the particular enzyme is not unstable at the pH. Most amylases will tolerate a pH from 2 to 7; however, inactivation may occur over an extended time period or with increased temperature at the extremes of this pH range. The preferred range is from pH 4 to 5 for fungal amylases. The resin for polymerization can be selected accordingly.

Drying may take place in a hot air oven or in vacuum oven at temperatures from ambient to 120° F. Increased temperatures progressively promote deactivation of the enzyme. Drying temperature should therefore be controlled to preserve the enzyme activity.

Upon drying, the immobilized enzymes show improved temperature stability and increased half life.

The process of this invention can be further understood by reference to the following illustrative examples:

Example 1

This example illustrates the immobilization process without drying of the product.

Freshly precipitated nylon was filtered. To 260 grams (80 percent $H_2O$) of this was added 1,500 ml. of Novo II, 9.3 I.G.U.'s/ml. After mixing, the excess enzyme was filtered off and 1 liter of a solution of Parez 707 (150 ml./liter, pH 4.2) was added. The mixture was agitated lightly for 10 hours. The material was washed with ion-exchange water and assayed. Activity was found to be 2.4 I.G.U.'s/gram dry weight.

Example 2

This example, and following Examples 3–8, illustrate the variety of usable carriers.

To 5 grams of freshly precipitated cellulose acetate was added 50 ml. Diazyme L-100 solution (77 I.G.U.'s/ml.). After mixing, the excess enzyme solution was filtered off and a solution containing 10.2 grams D.S. of Pacific Resins N-1709-J-1 at pH 4.2 added. After mixing, the material was air dried at 120° F., washed, assayed and found to contain 0.4 I.G.U.'s/gram dry weight.

Example 3

Granular carbon was well washed in de-ionized water. To 50 grams (wet weight) 31.4 percent $H_2O$, was added 100 ml. Diazyme L-100 solution (77 I.G.U.'s/ml.). After mixing, the excess enzyme solution was filtered off and a solution containing 16.3 grams D.S. of Pacific Resins N-1709-J-1, pH 4.2, was added and mixed. The material was air dried at 120° F., washed, assayed and found to contain 0.9 I.G.U.'s/gram dry weight.

Example 4

To 50g. wet (68.6 percent $H_2O$) polyvinylpyrrolidone was added 100 ml. of Diazyme L-100 solution (77 I.G.U's/ml.). After mixing the excess enzyme solution was filtered off and a solution containing 16.3 D.S. grams of Pacific Resins N-1709-J-1 pH 4.2 was added.

After mixing the material was air dried at 120° F., washed, assayed, and found to contain 1.3 I.G.U.'s/g. dry weight.

Example 5

To 50 g. of Absorbent Resin (Duolite S-30), 52.9 percent $H_2O$, was added 100 ml. of Diazyme L-100 solution 77 I.G.U.'s/ml. After mixing, the excess enzyme solution was filtered off. To the Duolite resin-enzyme mixture was added a solution containing 27 g. D.S. of Pacific Resin's N-1709-J-1 at pH 4.2. After mixing, the material was air dried at 120° F., washed, assayed, and found to contain 1.5 I.G.U.'s/gram dry weight.

Example 6

To 50 grams of dry ion exchange resin (Amberlite IRA 401-s) was added 150 ml. of Diazyme L-100 solution. After mixing, the excess enzyme solution was filtered off and a solution containing 27 g. D.S. of Pacific Resins N-1709-J-1 (pH 4.2) was added. The material was mixed, air dried at 120° F., washed, assayed and found to contain 2.9 I.G.U.'s/g. dry weight.

Example 7

To 20 g. of dry weight of cellulose was added 160 ml. of Diazyme L-100 solution (77 I.G.U.'s/ml.). After mixing, the excess enzyme solution was filtered off and a solution containing 27 grams D.S. of Pacific Resins N-1709-J-1 at pH 4.2 added. After mixing, the material was air dried at 120° F., washed, assayed and found to contain 4.6 I.G.U.'s/g. dry weight.

Example 8

To 50 grams of perlite filter aid (Sil-Flo 272)-65.1 percent $H_2O$, was added 100 ml. Diazyme L-100 solution (77 I.G.U.'s/ml.). After mixing, the excess enzyme solution was filtered off and a solution containing 16.3 grams D.S. of Pacific Resins N-1709-J-1(pH 4.2) added. After mixing, the material was air dried at 120° F., washed, assayed and found to contain 8.1 I.G.U.'s/gram dry weight.

Example 9

This example, and following Examples 10-16, illustrate the variety of usable resins.

Precipitated nylon which had been stored wet was filtered to remove excess moisture. To 250 grams was added 900 ml. of Diazyme L-100 solution, 78 I.G.U.'s/ml. The excess was filtered off and the nylon-enzyme mixture retained for further use. Moisture content equals 80 percent.

To 50 grams of the nylon-enzyme mixture, prepared as described above, was added 11 ml. Tybon 994, pH adjusted to 4.2, and mixed. The material was air dried at 120° F., washed, assayed and found to have an activity of 1.2 I.G.U.'s/gram dry weight.

Example 10

To 50 grams of the nylon-enzyme mixture, prepared as described in Example 9, was added 50 ml. of S-30-85-C resin, pH adjusted to 4.2, and mixed. The material was air dried at 120° F., washed, assayed and found to have an activity of 2.4 I.G.U.'s/gram dry weight.

Example 11

To 50 grams of the nylon-enzyme mixture, prepared as described in Example 9, was added 12 ml. of Tybon 5646, pH adjusted to 4.2, and mixed. The material was air dried at 120° F., washed, assayed and found to have an activity of 5.2 I.G.U.'s/gram dry weight.

Example 12

To 50 grams of the nylon-enzyme mixture, prepared as described in Example 9, was added 26 ml. of Amres 212, pH adjusted to 4.2, and mixed. The material was air dried at 120° F., washed, assayed and found to have an activity of 14.3 I.G.U.'s/gram dry weight.

Example 13

Precipitated nylon which had been stored wet was filtered to remove excess moisture. To 250 grams was added 900 ml. of Diazyme L-100 solution, 78 I.G.U.'s/ml. The excess was filtered off and the nylon-enzyme mixture retained for further use. Moisture content equals 80 percent.

To 50 grams of the nylon-enzyme mixture, prepared as described, was added 50 ml. of Tylite 10, pH adjusted to 4.2, and mixed. The material was air dried at 120° F., washed, assayed and found to have an activity of 15.3 I.G.U.'s per gram dry weight.

Example 14

To 50 grams of the nylon-enzyme mixture, prepared as described in Example 9, was added 7.2 g. D.M.U. in water solution, pH 4.2, and mixed. The material was air dried at 120° F., washed, assayed and found to have an activity of 29.6 I.G.U.'s/gram dry weight.

Example 15

To 50 grams of the nylon-enzyme mixture, prepared as described in Example 9, was added 9 ml. of Urac 180, pH adjusted to 4.2, and mixed. The material was air dried at 120° F., washed, assayed and found to have an activity of 30.0 I.G.U.'s/gram dry weight.

Example 16

To 50 grams of the nylon-enzyme mixture, prepared as described in Example 9, was added 50 ml. of Kymene 557, pH adjusted to 4.2, and mixed. The material was air dried at 120° F., washed, assayed and found to have an activity of 37.5 I.G.U.'s/gram dry weight.

Example 17

This example illustrates the possibility of mixing enzyme and resin before addition to the carrier.

A solution containing 70 ml. of resin N-1709-J-1, diluted 1 to 1 with water and pH adjustment of 4.2, and 250 ml. of Diazyme L-100, was added to 50 grams of cellulose. The material was well mixed and oven dried at 120° F. After drying, the material was reduced in particle size, washed thoroughly with water, and assayed. It was found to contain an activity of 10.6 I.G.U.'s/gram dry weight.

Example 18

This example illustrates the long half life of the new immobilized enzyme product.

Freshly precipitated nylon was filtered using a Buchner funnel. After filtration, moisture content was approximately 80 percent. To a sample containing 36 grams D.S. was added 800 ml. of Diazyme L-100 solution containing 75.0 I.G.U./ml. After thorough mixing the excess enzyme solution was drained off reclaiming 550 mls. of a solution containing 60 I.G.U.'s/ml. The lower enzyme activity of the reclaimed solution is due to dilution by the water on the wet carrier.

To the nylon-enzyme mixture was added 1 liter of resin solution (Pacific Resin N-1709-J-1, methylated melamine formaldehyde) 20.6 percent D.S. (218 grams) which had been adjusted to 4.2 pH.

The enzyme-resin solution was drained off reclaiming 1,000 ml. Approximately 200 percent dry weight resin was retained on dry solid weight of carrier.

The nylon-enzyme-resin mixture was dried overnight in a vacuum oven at 100° F.

After drying, the product was washed several times in water and assayed. The product was found to have an activity of 20.0 I.G.U.'s/gram dry weight.

30 grams dry weight was packed into a glass column 1 × 20 inches. At a rate of 225 ml./hr., 30 percent D.S., 20 D.E. syrup was passed through the column at 140° F. producing a product with average D.E. of 88.4 for 12 days with no noticeable change in conversion characteristics.

Example 19

This Example, and Example 20, illustrate the use of more than one enzyme.

Freshly precipitated nylon was filtered on a Buchner funnel and 50 grams (80 percent $H_2O$) transferred to a beaker. To this was added 100 ml. enzyme solution (Diazyme L-100 75 I.G.U.'s/ml.) and 2 grams of Fungamyl (215 I.G.U's/g). The excess enzyme solution was drained off and 40 mls. reclaimed. To the nylon-enzyme mixture was added 50 ml. of a solution containing 10.8 g. of N-1709-J-1 equivalent to 108 percent D.S. on D.S. weight of nylon.

The sample was dried overnight at 100° F. in a forced air oven.

The product was well washed and assayed obtaining an activity of 38.2 I.G.U.'s/gram dry weight.

Example 20

815 mls. of an enzyme solution containing Diazyme L-100 and Asperzyme having an activity of 67 I.G.U.'s/ml (of which 30 percent was represented as alpha amylase activity), was added to 100 grams wet weight nylon. (75 percent $H_2O$)

The excess enzyme was filtered off leaving a nylon-enzyme mixture of 143.3 grams. To this was added 36 ml. of a 54 percent solution of N-1709-J-1 resin, pH 4.2. The mixutre was dried overnight at 120° F. in a forced air oven.

The product was washed and assayed and found to have an activity of 26.8 I.G.U.'s/gram D.S. When packed in a column, the enzyme produced a product of 92 D.E. at a flow rate of 100 ml/hr and at 140° F., using a total of 396 I.G.U.'s.

Example 21

This example illustrates the preparation of a high activity immobilized enzyme.

To 100 grams of precipitated nylon (81.2 percent $H_2O$) was added 400 ml. of Diazyme L-100 solution. After mixing, the excess enzyme solution was filtered off. A solution containing 12.1 gram D.S. Pacific Resins N-1709-J-1, pH 4.2, was added and mixed. The material was then dried at 120° F., washed, assayed and found to contain 114.1 I.G.U.'s/gram dry weight.

Example 22

This example illustrates industrial utility of the immobilization process.

To 100 grams of freshly precipitated nylon containing 79.4 percent of water, was added 300 cc's of purified Asperzyme solution containing an activity of 80 I.G.U.'s per ml. After thorough mixing, the excess enzyme solution was filtered off, using a Buchner funnel. A solution containing 14.9 grams dry solid of resin N-1709-J-1 at a ph of 4.2 was added and mixed well. The material was dried in a vacuum oven at 120° F., washed thoroughly with water, and assayed. It was found to contain an activity of 19.7 I.G.U.'s per gram dry weight.

A column was prepared using a sample of this immobilized enzyme. Using various substrates and varying the flow rate, several high maltose type products of varying D.E.'s and varying sugar profiles were produced.

The materials referred to by trade names in the foregoing examples are further identified as follows:

Enzymes

| Trade Name | Type | Supplier |
| --- | --- | --- |
| Diazyme L-100 | Glucoamylase | Miles Laboratories, Elkhart, Ind. |
| Novo II | Glucoamylase | Novo Enzyme Corporation Mamaroneck, New York |
| Fungamyl | Fungal Alpha Amylase | Novo Enzyme Corporation |
| Asperzyme | Fungal Alpha Amylase | Enzyme Development Corporation New York, New York |

Carriers

| Trade Name | Type | Supplier |
| --- | --- | --- |
| Duolite S-30 | Absorbent Resin | Diamond Chemicals, Redwood City, California |
| Carbon | Activated, Granular | Pittsburgh Carbon Pittsburgh, Pa. |
| Cellulose | Cellulose ER-10 | Buckeye Cellulose Corp. Memphis, Tenn. |
| Sil-Flo 272 | Perlite filter aid | Sil-Flo Corp. Fort Worth, Texas |
| I.R.A. 401-S | Amberlite Ion Exchange | Rohm & Haas Philadelphia, Pa. |
| PVP | Water Insoluble Porous Bead | G A F Corporation, New York |

Enzymes—Continued

| Trade Name | Type | Supplier |
|---|---|---|

Resins

| Trade Name | Type | Supplier |
|---|---|---|
| Tylate 10 | Cationic Polyacrylamide | Pacific Resins & Chemicals Seattle, Wash. |
| Tybon 5646 | Alkyd, alcohol borne | Pacific Resins & Chemicals Seattle, Wash. |
| Tylyte 9 | Polyamideamine-epichlorhydrin fully cross-linked | Pacific Resins & Chemicals Seattle, Wash. |
| Kymee 557 | Polyamideamine, highly reactive | Hercules Inc., Wilmington, Delaware |
| Amres 212 | Cationic Urea-formaldehyde | Pacific Resins & Chemicals Seattle, Wash. |
| Tybon 994 | Solvent borne phenolic | Pacific Resins & Chemicals Seattle, Wash. |
| D.M.U. | Dimethylol-urea | Glyco Chemicals, New York, New York |
| Parez 707 | Melamine Formaldehyde | American Cyanamid Co. New York, New York |
| N-1709-J-1 | Methylated Melamine-formaldehyde | Pacific Resins & Chemicals Seattle, Wash. |
| Urac 180 | Urea Formaldehyde | American Cyanamid Co., New York, New York |

In certain of the foregoing examples reference is made to "precipitated nylon" or "freshly precipitated nylon." Precipitated nylon is disclosed as a carrier for adsorbed enzymes in Example 29 of Belgium Patent No. 764,369. The polycaprolactam nylon of this example is precipitated from a formic acid solution thereof by addition to water. Such nylon precipitates have been found to be fibrous. While such material can be used for practicing the present invention, it may be too compressible for use in packed continuous operation columns. In such applications, where the fibrous carrier packs under pressure flow of the solution being treated, flow rates may be reduced, or the columns may completely plug. Accordingly, it has been found desirable to precipitate the nylon in the form of a floc which is relatively non-fibrous, and which is much less compressible in column application.

It was found that by a unique method of precipitation of nylon from a formic acid solution, a product can be produced in the form of very small spheres, adhering together in small clusters which are soft and spongy and, when compressed and released, will return to their original shape. The critical parameters which need to be controlled for the formation of this product are temperature, concentration, and rate of precipitation. This product is especially well suited for a column operation.

The physical form of the precipitated nylon can be improved further by utilizing a mixture of two different nylons, which have differential solubilities in the formic acid or other organic solvent from which they are precipitated into water. For example, Nylon 66 can be used in admixture with other known nylons, such as Nylon 6 or Nylon 610. As is known in the art, Nylon 66 is made from hexamethylenediamine and adipic acid, while Nylon 6 uses caprolactam as its starting material. Nylon 610 is made from hexamethylenediamine and sebacic acid. In particular, it has been found that mixtures of Nylon 6 with a minor proportion by weight of Nylon 66 are particularly suitable. Consequently, for practicing the process of this invention, as illustrated by the foregoing examples, either Nylon 6 or Nylon 66 can be used but a mixture has been found to perform the best. For example, a formic acid solution of Nylon 6 and Nylon 66 can be prepared containing the proportions of 6 grams Nylon 6 and 1 gram Nylon 66 per 90 ml. of 98 percent formic acid. After good agitation to fully dissolve and disperse the nylons, water is added to the formic acid solution at room temperature or below. Proportions used may be approximately equal parts by volume of the formic acid solution and the water. Agitation may then be continued for a few seconds, and then a further amount of water is added, such as approximately 200–300 ml. of water per 90 ml. of the formic acid solution. The precipitated nylon will be in the form of very small spheres, and the spheres will be clustered, providing a spongy floc. The precipitated nylon material is sufficiently spongy that when compressed, it returns to its original shape. It has a capacity to hold large amounts of water, up to 90–95 percent of total weight. After precipitation, the nylon material may be washed by mixing it with water and draining, and the product may then be stored in a wet state. As indicated in the foregoing examples, it is particularly desirable to employ the nylon in a freshly prepared form.

We claim:

1. The process of immobilizing a water-soluble enzyme on a carrier, wherein an aqueous solution of an enzyme is contacted with a water-insoluble carrier material for fixation of said enzyme thereon, and said carrier material while said surfaces are wetted with said enzyme solution is contacted with an aqueous solution of film-forming resin, said resin being in the process of polymerization to a water-insoluble state at a temperature and pH at which said enzyme is stable, wherein the improvement comprises employing nylon in the form of a spongy floc as said carrier material, and depositing on the exposed enzyme solution coated surfaces of said nylon floc carrier material a water-insoluble film of said resin containing said enzyme in active form.

2. The process of claim 1 in which said enzyme is a water-soluble amylase.

3. The process of claim 1 in which said enzyme solution is applied first to said carrier material, excess enzyme solution is separated from the wetted carrier material, and thereafter said film-forming resin solution is applied.

4. The process of claim 1 further characterized by the steps of separating the excess of said enzyme and said film-forming resin solutions from said carrier material, and drying the carrier material with said enzyme containing films on said surfaces under temperature conditions at which said enzyme is stable.

5. The process of claim 1 in which said film-forming resin is selected from the class consisting of melamine resins, methylated melamine formaldehyde resins, and urea formaldehyde resins.

6. The process of immobilizing a water-soluble amylase on a carrier, characterized by the combination of steps comprising: contacting an aqueous solution of said amylase with a carrier material consisting essentially of nylon in the form of a spongy floc, said carrier material providing hydrophilic external surfaces having an affinity for said enzyme aqueous solution, also contacting said carrier material while in contact with at least a portion of said aqueous enzyme solution with an aqueous solution of a water-soluble film-forming resin, said resin being in the process of polymerization to a water-insoluble state at a temperature and pH at which said enzyme is stable, depositing on said surfaces of said carrier material a water-insoluble resin film-containing said amylase enzyme in active form, separating the excess of said amylase and said film-forming resin solutions from said carrier material, and drying the carrier material with said enzyme containing films on said surfaces under temperature conditions at which said enzyme is stable.

7. The process of claim 6 in which said film-forming resin is selected from the class consisting of melamine resins, methylated melamine formaldehyde resins, and urea formaldehyde resins.

8. The process of claim 6 in which said aqueous solution of said enzyme is first mixed with said aqueous solution of film-forming resin prior to contacting said carrier material.

9. The process of claim 6 in which said water insoluble carrier is contacted with a plurality of aqueous solutions of different enzymes before said resin has polymerized to a water insoluble state.

\* \* \* \* \*